(12) United States Patent
Burrows

(10) Patent No.: US 8,424,554 B2
(45) Date of Patent: Apr. 23, 2013

(54) CONTROL VALVE FOR A REVERSE OSMOSIS WATER PURIFICATION SYSTEM

(76) Inventor: Bruce D. Burrows, Valencia, CA (US)

(*) Notice: Subject to any disclaimer, the term of this patent is extended or adjusted under 35 U.S.C. 154(b) by 427 days.

(21) Appl. No.: 12/749,787

(22) Filed: Mar. 30, 2010

(65) Prior Publication Data

US 2010/0243942 A1 Sep. 30, 2010

Related U.S. Application Data

(60) Provisional application No. 61/164,544, filed on Mar. 30, 2009.

(51) Int. Cl.
*F16K 31/06* (2006.01)
(52) U.S. Cl.
USPC ..... 137/87.05; 137/595; 137/100; 210/257.2; 210/109; 210/652
(58) Field of Classification Search ............... 137/594, 137/595, 625.18, 87.01, 87.05, 100; 210/257.2, 210/109, 652
See application file for complete search history.

(56) References Cited

U.S. PATENT DOCUMENTS

| | | | |
|---|---|---|---|
| 3,794,173 A * | 2/1974 | Bray | 210/257.2 |
| 4,176,063 A * | 11/1979 | Tyler | 210/101 |
| 4,585,554 A | 4/1986 | Burrows | |
| 4,595,497 A | 6/1986 | Burrows | |
| 4,657,674 A | 4/1987 | Burrows | |
| 4,853,117 A * | 8/1989 | Burrows | 210/110 |
| 4,867,201 A * | 9/1989 | Carten | 137/625.18 |
| 4,885,085 A * | 12/1989 | Beall, Jr. | 210/137 |
| 5,045,197 A | 9/1991 | Burrows | |
| 2008/0087587 A1 | 4/2008 | Burrows | |

* cited by examiner

*Primary Examiner* — John Rivell
*Assistant Examiner* — Ian Paquette
(74) *Attorney, Agent, or Firm* — Lowry Blixseth LLP; Scott M. Lowry

(57) ABSTRACT

An improved control valve for a reverse osmosis (RO) water purification system for supplying relatively pure water for on-demand dispensing, wherein the improved control valve positively terminates pure water production and brine outflow to a waste or drain when a pure water reservoir reaches a substantially filled condition. The control valve responds to a predetermined pressure differential between a tap or feed water inflow and produced pure water to close a pure water outflow line when the pure water reservoir reaches a substantially filled condition, thereby positively preventing further production of pure water. Shortly thereafter, the control valve closes a brine outflow line thereby positively preventing further water flow through the system until at least a predetermined volume of the reservoir-stored pure water is dispensed. When this occurs, the control valve re-opens in sequence the brine outflow and the pure water outflow lines.

30 Claims, 7 Drawing Sheets

CONTROL VALVE FOR A REVERSE OSMOSIS WATER PURIFICATION SYSTEM

BACKGROUND OF THE INVENTION

This invention relates generally to improvements in water purification systems of the type having a reverse osmosis (RO) unit or the like for removing dissolved ionic material and other contaminants from an ordinary supply of tap water or the like. More particularly, this invention relates to an improved control valve for a reverse osmosis water purification system, the control valve for positively and preferably sequentially terminating pure water production and brine outflow to a waste or drain when a pure water reservoir reaches a substantially filled condition.

Water purification systems in general are well-known in the art of the type having a reverse osmosis (RO) unit or membrane for converting an incoming supply of ordinary tap or feed water into relatively purified water for use in cooking, drinking, etc. In general terms, the reverse osmosis unit comprises a semi-permeable RO membrane through which a portion of the tap water supply is passed, such that the membrane acts essentially as an osmotic filter to remove dissolved metallic ions and the like as well as other contaminants and undesired particulate matter from the tap water. In normal operation, these impurities are removed from one portion of the water flow to produce relatively pure water, with the removed impurities being concentrated in another portion of the water flow, commonly referred to as retentate or brine, which is normally discharged as waste to a drain. The thus-produced flow of relatively purified water is available for immediate dispensing for use, and/or for temporary storage within a suitable reservoir or vessel awaiting dispensing for use. A pure water dispense faucet mounted typically on or adjacent to a kitchen-type sink or the like is manually operable to dispense the produced purified water. While the specific construction and operation of such RO water purification systems may vary, such systems are exemplified by those shown and described in U.S. Pat. Nos. 4,585,554; 4,595,497; 4,657,674; and 5,045,197.

Reverse osmosis water purification systems of this general type rely upon a minimum pressure differential across the RO membrane to produce purified water. In this regard, this pressure differential is relatively maximized when a pure water storage reservoir is substantially empty, but progressively decreases as the pure water storage reservoir fills. Decreased pressure differential across the RO membrane has inherently resulted in a decreased volume of produced purified water. When the pure water storage reservoir reaches a substantially filled condition, prior art systems have generally functioned to turn the system "off" by closing or attempting to close a tap or feed water inflow valve, to halt system water flow-through and thereby minimize associated water waste in this "off" condition. Alternative proposals have envisioned a retentate or brine flow shut-off valve to halt system water flow-through while the system is "off". However, these approaches undesirably leave unflushed concentrated contaminants at an upstream side of the RO membrane, whereat these contaminants can migrate through the RO membrane to the pure water side while the system is in the "off" condition. Accordingly, desirable minimization of waste water has been accompanied by undesirable potential contamination of the produced pure water.

There exists, therefore, a significant need for further improvements in and to reverse osmosis water purification systems, and particularly with respect to an improved control valve wherein water waste is substantially eliminated when a pure water reservoir reaches a substantially filled condition, but wherein such reduced water waste is not accompanied by any significant contamination of the already-produced pure water. The present invention fulfills these needs and provides further related advantages.

SUMMARY OF THE INVENTION

In accordance with the invention, a reverse osmosis (RO) water purification system is provided for supplying relatively pure water for on-demand dispensing. The RO system includes an improved control valve for positively terminating pure water production and brine outflow to a waste or drain, preferably sequentially, when a pure water storage reservoir reaches a substantially filled condition. By terminating pure water production before terminating brine or retentate outflow to a drain, the control valve permits a water flush flow across an upstream side of an RO membrane to flush accumulated contaminants to the drain. Thereafter, in response to pure water dispensing, the control valve resumes pure water production and brine outflow.

The control valve for the reverse osmosis water purification system comprises a multi-part valve housing having first and second ends. A pure water chamber is disposed at the first end of the valve housing and a brine water chamber is disposed at the second end. The pure water chamber has a pure water inflow port, a pure water outflow port and a pure water valve head slidably disposed therein. The brine water chamber has a brine water inflow port, a brine water outflow port and a brine water valve head slidably disposed therein, and is also coupled to a feed water source.

A central cavity is disposed between the pure water chamber and the brine water chamber. The central cavity is exposed to atmospheric pressure while being hermetically sealed from the pure water chamber by a first resilient diaphragm and from the brine water chamber by a second resilient diaphragm. A frame is disposed in the central cavity and operatively connected to the pure water valve head through the first resilient diaphragm and the brine water valve head through the second resilient diaphragm. The frame, pure water valve head and brine water valve head are slidable as a single structure within the valve housing between an open position and a closed position.

The pure water valve head and the brine water valve head may comprise a magnetically attractable material, such as stainless steel. Preferably, the frame carries a pair of magnets to operatively connect the frame to the pure water valve head and the brine water valve head.

Being operatively connected to the frame, the pure water valve head and the brine water valve head are slidable in response to a pressure differential between a back pressure from the pure water outflow port exerted on the first resilient diaphragm and a head pressure from the feed water source exerted on the second resilient diaphragm. Preferably, the first and second resilient diaphragms have relative surface areas configured to slide the pure water valve head and the brine water valve head from the open position to the closed position when the ratio of the back pressure from the pure water outflow port to the head pressure from the feed water source is greater than or equal to 2:3.

The brine water chamber includes an elongated brine valve stem operatively connected to the brine water valve head at a first end and proximate to a brine shut-off valve seat at an opposite second end. When the pure water valve head engages a pure water shut-off valve seat in the closed position, the elongated brine valve stem engages the brine shut-off valve seat when in the closed position. The elongated brine valve stem and the brine shut-off valve seat are configured to engage in the closed position a predetermined time period after the pure water valve head engages the pure water shut-off valve seat in the closed position. This predetermined time period is preferably one to three minutes.

A brine poppet valve is disposed between the brine water inflow port and the brine water chamber. The brine poppet valve has a poppet head biased against a poppet seat by fluid pressure from a brine water inflow and includes a shallow groove. The shallow groove defines a fixed flow orifice through the brine poppet valve when the poppet head is biased against the poppet seat. The brine poppet valve is spring biased away from the poppet seat when the brine water valve head is in the closed position.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
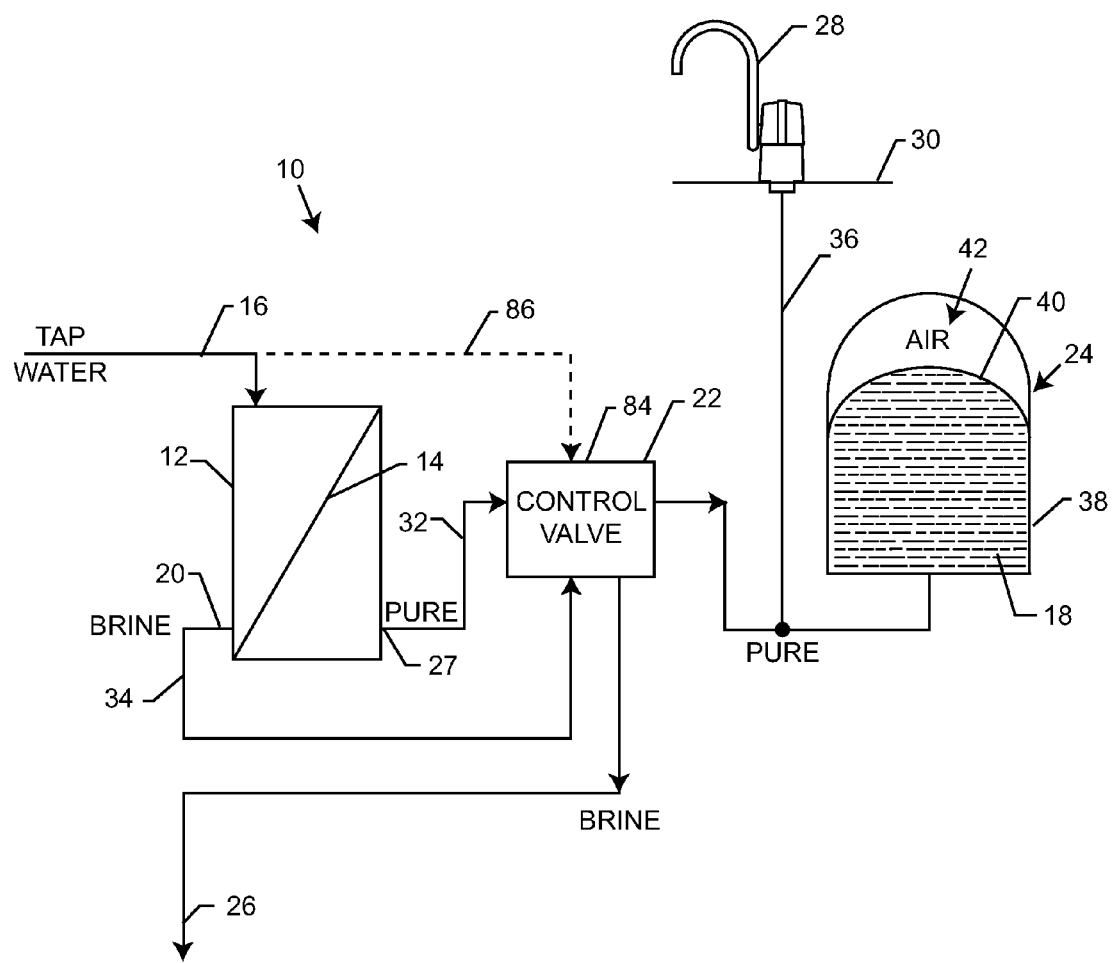
FIG. 1 is a schematic diagram illustrating a reverse osmosis (RO) water purification system including an improved control valve embodying the novel features of the present invention.

As shown in the exemplary drawings, an improved reverse osmosis (RO) water purification system referred to generally in FIG. 1 by the reference numeral 10 includes a reverse osmosis (RO) unit or cartridge 12 having a reverse osmosis (RO) membrane 14 illustrated schematically therein for separating a tap or feed water inflow via an inflow conduit 16 into relatively purified water 18 available for on-demand dispensing, and a so-called retentate or brine flow at a brine outlet port 20 having contaminants and impurities substantially concentrated therein. In accordance with the invention, the system 10 includes an improved control valve 22 for positively and preferably sequentially terminating pure water production and brine outflow to a waste or drain when a pure water storage reservoir 24 reaches a substantially filled condition. By terminating pure water production before terminating brine or retentate outflow to a drain 26, the control valve 22 permits a water flush flow across an upstream side of an RO membrane 14 to flush accumulated contaminants to the drain 26.

The illustrative reverse osmosis water purification system 10 is designed to provide a ready supply of substantially purified water 18 for drinking and cooking purposes, etc. The system 10 is generally designed for residential or household use, or for use in a commercial facility particularly such as an office or the like, installed typically within the compact cabinet space located beneath a kitchen-type sink (not shown) or the like, with a pure water dispense faucet 28 normally mounted on a countertop 30 on or adjacent the sink for on-demand pure water dispensing.

In general terms, tap or feed water flows via the inflow conduit 16 to the RO unit 12. During normal pure water production this tap water inflow is separated by the RO membrane 14 into the relatively purified water 18 having contaminants substantially removed therefrom which flows outwardly from the RO unit 12 via a pure outflow port 27 through a pure water outflow conduit 32, and the brine or retentate flow 20 having contaminants substantially concentrated therein which flows from the RO unit 12 via a brine outflow conduit 34. The pure and brine outflow conduits 32, 34 are both coupled in-line with the improved control valve 22 which, during normal pure water production, regulates pure water flow to the pure water storage reservoir 24 and/or to a dispense conduit 36 leading to the countertop-mounted dispense faucet 28. As shown in FIG. 1, this storage reservoir 24 typically includes a dual-chamber canister or housing 38 having a resilient bladder 40 separating an upper air-filled chamber 42 from a lower chamber having the produced purified water 18 therein. The control valve 22 additionally regulates flow of the brine or retentate 20 to the drain 26.

In normal operation, produced purified water 18 is available for on-demand dispensing by means of the faucet 28, while produced brine or retentate is discharged to the waste or drain 26. In accordance with the invention, the improved control valve 22 responds to a predetermined pressure differential between the tap water inflow and the produced purified water stored within the reservoir 24 to positively terminate pure water production when the storage reservoir 24 reaches a substantially filled condition. Thus, the control valve 22 positively terminates further production of pure water, unless and until some of the pure water is dispensed from the storage reservoir 24. The control valve 22 also closes in a preferably sequential manner, with a time delay after terminating pure water production, the brine outflow to the drain 26. In a preferred form, this time delay can be several minutes in duration, i.e., between one and three minutes. Accordingly, during the time delay after pure water production is halted, any accumulated contaminants present at an upstream side of the RO membrane 14 are flushed through the brine outflow conduit 34 to the drain 26, followed by positive closure of the brine outflow conduit 34 to terminate further water flow through the RO system 10.

Figure 4:
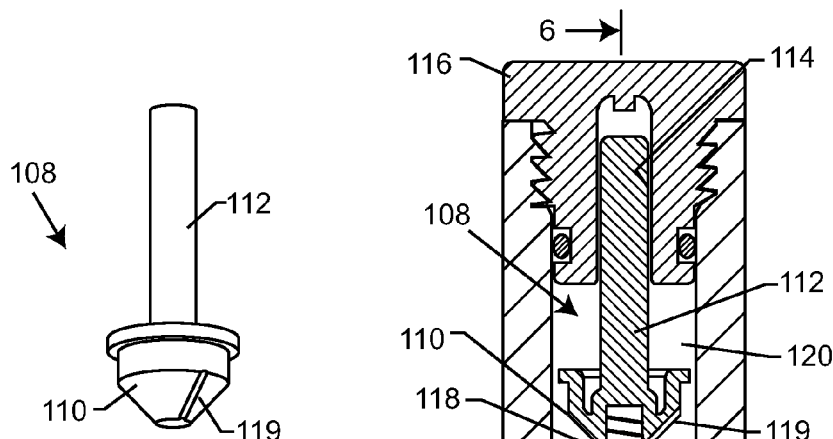
FIG. 4 is an enlarged perspective view showing a throttling groove formed in a face of the brine poppet valve.

Thereafter, when a sufficient quantity of produced purified water 18 has been dispensed from the storage reservoir 24, the control valve 22 re-opens the pure water and brine outflow conduits 32, 34 for resumed pure water production. In accordance with one aspect of the invention, re-opening of the brine outflow conduit 34 includes initial flushing of a flow restrictor or orifice 119 (shown best in FIG. 4) disposed in-line with the brine outflow conduit 34, thereby preventing accumulation of contaminants and/or particulate at or within said orifice.

The improved control valve 22 is shown in more detail in FIGS. 2-7. As shown, the control valve 22 generally comprises a multi-part valve housing 44 including multiple stacked components normally held in assembled relation by means of a plurality of screws 46 or the like. A ported cap 48 is mounted at a lower end of the assembled valve housing 44 to support a porous inlet filter element 50 which is retained therein by a lower end plate 52. This lower end plate 52 defines a pure water inflow port 54 for suitable coupling in-line with the pure water outflow conduit 32 from the RO unit 12. Accordingly, the produced purified water 18 flowing through the conduit 32 is inputted via the inflow port 54 and further through an annular array of inflow ports 56 into a lower region within the valve housing 44.

The produced purified water 18 within the lower control valve chamber 56 is applied against a lower face 58 of a pure water shut-off valve head 60, which comprises a lower component of an elongated and linearly moveable valve structure contained within the valve housing 44. More particularly, the pure shut-off valve head 60 is vertically reciprocal or slidably received within a cylindrical sleeve 62 for movement between a normal open position (FIGS. 2-3) with an annular seal member 64 thereon displaced downwardly into a radially enlarged lower cavity 66 defined by the sleeve 62, and a closed position (FIG. 5) with the seal member 64 retracted upwardly into sealing relation with a smaller-diameter bore 68 defined by the sleeve 62. Importantly, when the pure shut-off valve head 60 is in the open position, the pure water within the lower chamber 56 may flow upwardly through an annular space defined by the sleeve bore 68 and a smaller-diameter upper zone 70 of the valve head 60, into an upper pure water chamber 72 defined at the underside of a lower resilient diaphragm 74. From this upper pure water chamber 72, when the pure shut-off valve 60 is in the open position (FIG. 2), the produced purified water 18 may flow further from the valve housing 44 via a suitable outlet port (not shown) for passage to the storage reservoir 24 (as viewed in FIG. 1), or alternately for passage to and dispensing from the faucet 28.

The resilient diaphragm 74 separates the upper pure water chamber 72 from a central cavity 78 coupled via a vent 80 or the like to atmospheric pressure. An upper side of the central cavity 78 is closed by a comparatively smaller area upper or second resilient diaphragm 81 having an upper surface exposed to an upper chamber 82 coupled via a suitable port 84 (FIG. 1) and associated conduit 86 (also depicted in FIG. 1) to the tap or feed water. A pair of vertically separated magnets 88, 90 are carried on a frame 92 within the central cavity 78, and are attached magnetically and in a hermetically sealed manner respectively to the underlying pure water shut-off valve head 60 and to an overlying brine shut-off valve head 94. In this regard, the pure water shut-off valve head 60 and the brine shut-off valve head 94 are preferably constructed from a magnetically attractable material, such as a magnetically attractable stainless steel.

With this construction, the linearly movable valve structure within the control valve 22, including the pure water shut-off valve head 60, is movably displaced according to the pressure differential between the tap water inflow pressure in the upper chamber 82 and the pressure of the produced purified water 18 at the lower chamber 56. By selecting the relative areas of the lower and upper resilient diaphragms 74, 81, the pure water shut-off valve head 60 can be controlled to remain open unless and until the storage reservoir 24 reaches a substantially filled condition. That is, with the air-filled reservoir chamber 42 (FIG. 1), the back-pressure applied by means of the storage reservoir 24 increases progressively as the volume of the stored produced purified water within the reservoir increases. In one preferred embodiment of the invention, the relative areas of the diaphragms 74, 81 are selected to shift the pure water shut-off valve head 60 from the open position to the closed position when the pressure differential of pure/tap water reaches a ratio of about 2/3. In a typical operating environment with a tap water inflow pressure of about 60 psi, this would result in movement of the pure water shut-off valve head 60 to the closed position when the pressure within the storage reservoir 24 reaches about 40 psi.

Figure 2:
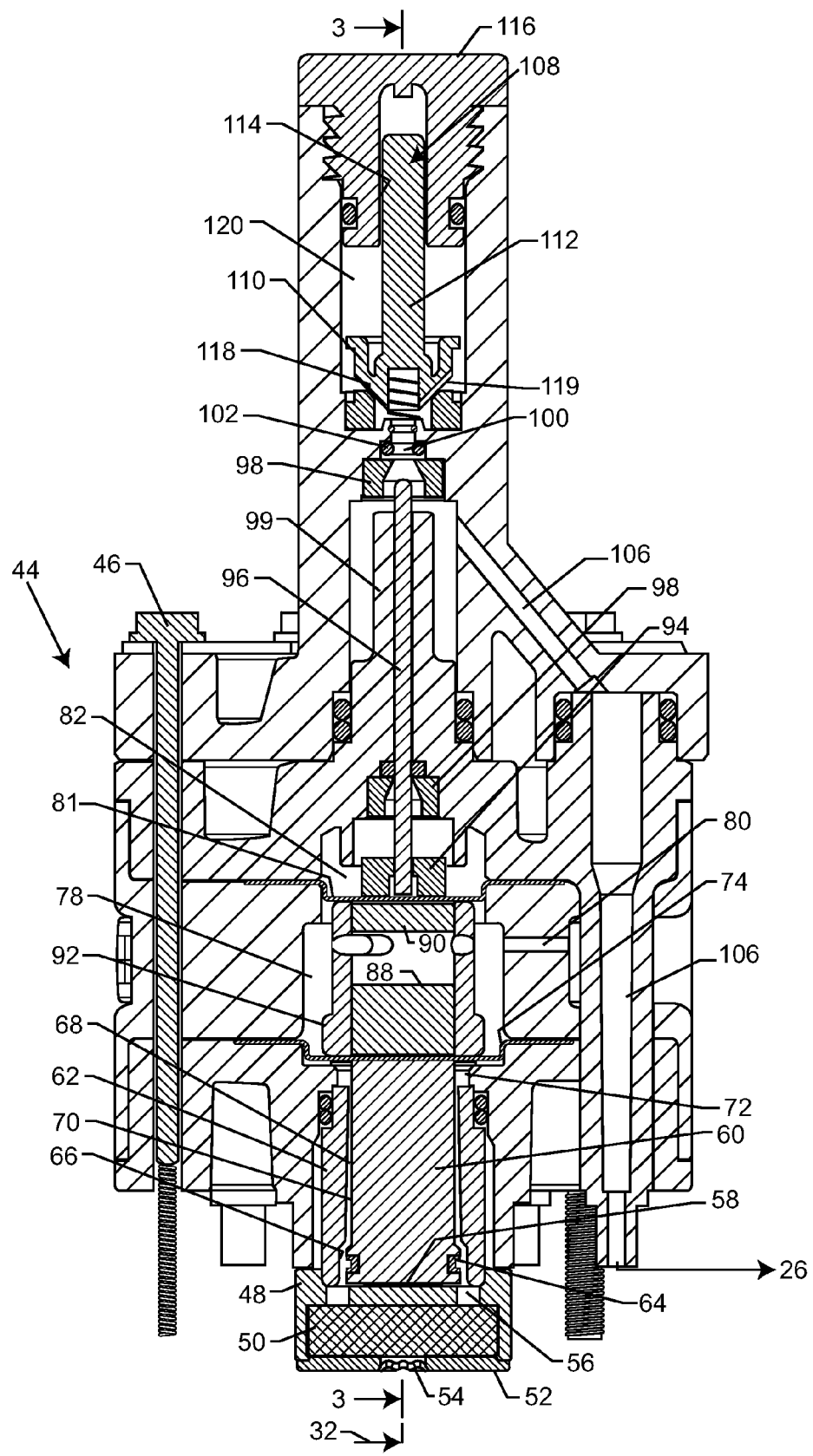
FIG. 2 is an enlarged vertical sectional view of the improved control valve, and showing an internal valve assembly with a pure water valve head and a brine valve stem in open positions, and a brine poppet head in a throttling position for normal pure water production.
Figure 3:
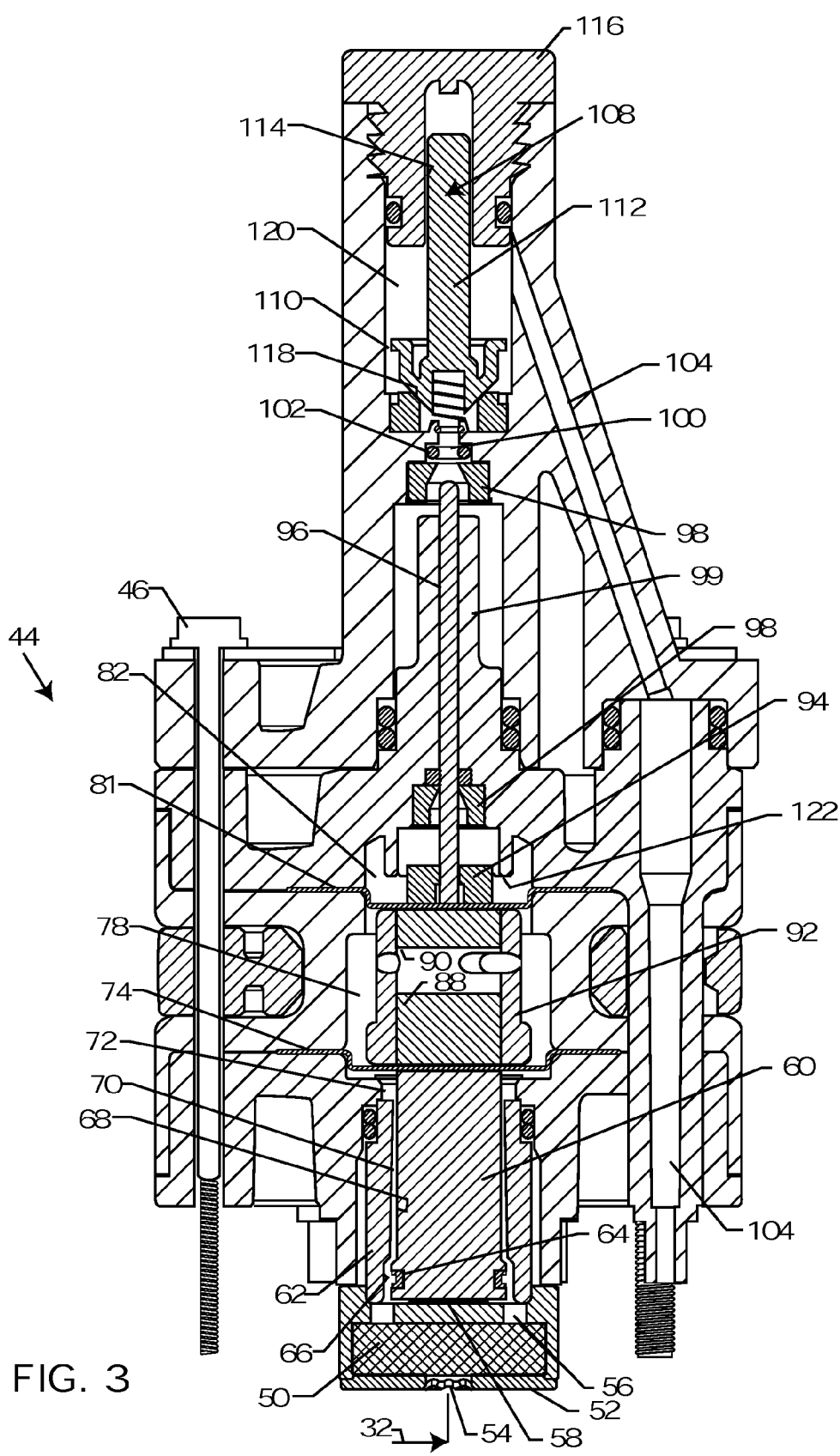
FIG. 3 is a vertical sectional view taken generally on the line 3-3 of FIG. 2.

With the pure water shut-off valve head 60 in the normal open position for pure water production, the two diaphragms 74, 81 are shifted slightly downwardly (as shown in FIGS. 2-3) to draw down on the brine shut-off valve head 94. As shown, this brine valve head 94 carries a lower end of an elongated brine valve stem pin 96 which projects upwardly through a pair of vertically spaced seal bushings 98 and an elongated guide 99 to terminate in operative relation with a brine valve seat 100 lined by a O-ring seal member 102 or the like. In the open position as described, the upper tip or free end of this stem pin 96 is spaced a short distance below the associated valve seat 100 and the associated upper seal bushing 98 to permit brine flow passage therethrough. This permits the brine or retentate flow 20 from the RO unit 12 to pass through a brine inflow passage 104 (FIGS. 3 and 6) in the valve housing 44 and downwardly through the open valve seat 100 before exiting via a brine outflow passage 106 (FIGS. 2 and 5) for flow further through the brine conduit 34 to the drain 26 (FIG. 1).

A brine poppet valve 108 is mounted within the control valve housing 44 at an upper end thereof, and comprises a poppet head 110 having a face of generally conical cross sectional shape, with said head 110 being carried by an upwardly projecting poppet stem 112. This poppet stem 112 is slidably carried within a track 114 defined by a threaded plug 116 mounted at an upper end of the control valve housing 44. The poppet head 110 defines a relatively larger upper area and a smaller tapered conical face for normally engaging a matingly tapered valve seat 118 within the control valve at a position above and slightly upstream relative to the brine shut-off valve seat 100. A shallow groove 119 (shown best in FIG. 4) is formed in the face of the poppet head 110 to define a fixed area flow restrictor or orifice through which brine or retentate 20 may flow when the shut-off valve stem pin 96 is in the normal open position (as shown in FIGS. 2-3). In this regard, brine inflow into a chamber 120 at the larger upper side of the poppet head 110 normally biases the poppet head 110 into seated engagement against the associated poppet seat 118.

However, when the pure water shut-off valve head 60 at the lower end of the valve structure is shifted upwardly to the closed position (shown in FIGS. 5-6), the seal member 64 thereon sealingly engages with the smaller-diameter bore 68 of the sleeve 62 to halt further upward flow of produced purified water to the diaphragm chamber 72 and on to the pure water storage reservoir 24 (as previously described). In this regard, in accordance with a preferred form of the invention, the seal member 64 comprises a so-called quad-type seal having a substantially I-beam cross sectional shape to provide redundant axially spaced upper primary and lower secondary seal interfaces with the sleeve bore 68. Such quad-type seal member is shown and described in more detail in U.S. Publication No. 2008/0087587, which is incorporated by reference herein.

More particularly, with the quad-type seal member 64 as shown, pure water production is halted as the upper primary seal ring structure engages the smaller-diameter bore 68 of the cylindrical sleeve 62. Following this initial halting of pure water production, the pressure within the lower chamber 56 at the lower end of the pure water shut-off valve head 60 gradually increases to near or substantially the pressure of the feed or tap water, thereby slowly displacing the valve head 60 further in an upward direction. In this regard, initial pure water production as the primary seal ring engages the sleeve bore 68 is accompanied by short upward displacement of the brine shut-off valve stem pin 96, but wherein this initial upward displacement is insufficient to close the stem pin 96 with the associated valve seat 100. Accordingly, in the preferred form, brine flow through the control valve 22 continues for at least several minutes until the pressure within the lower chamber 56 builds sufficiently to displace the entire valve structure further upwardly for sealingly engaging the stem pin 96 with the valve seat 100. An annular stop 122 within the valve housing 44 is abutted by the upper diaphragm 81 when this sealed brine-stop flow position is reached.

During this time delay, however, the brine flow continues for beneficially flushing any accumulated contaminants at an upstream side of the RO membrane 14 through the system to the drain 26. Accordingly, any such accumulated contaminants are prevented from slowly migrating through the RO membrane 14 to undesirably provide a slug of contaminated water in the pure outflow lines when pure water production is resumed. Similarly, flushing of the accumulated contaminants from the upstream side of the RO membrane 14 also enhances membrane performance to produce purified water upon resumed flow to and through the membrane 14.

Figure 5:
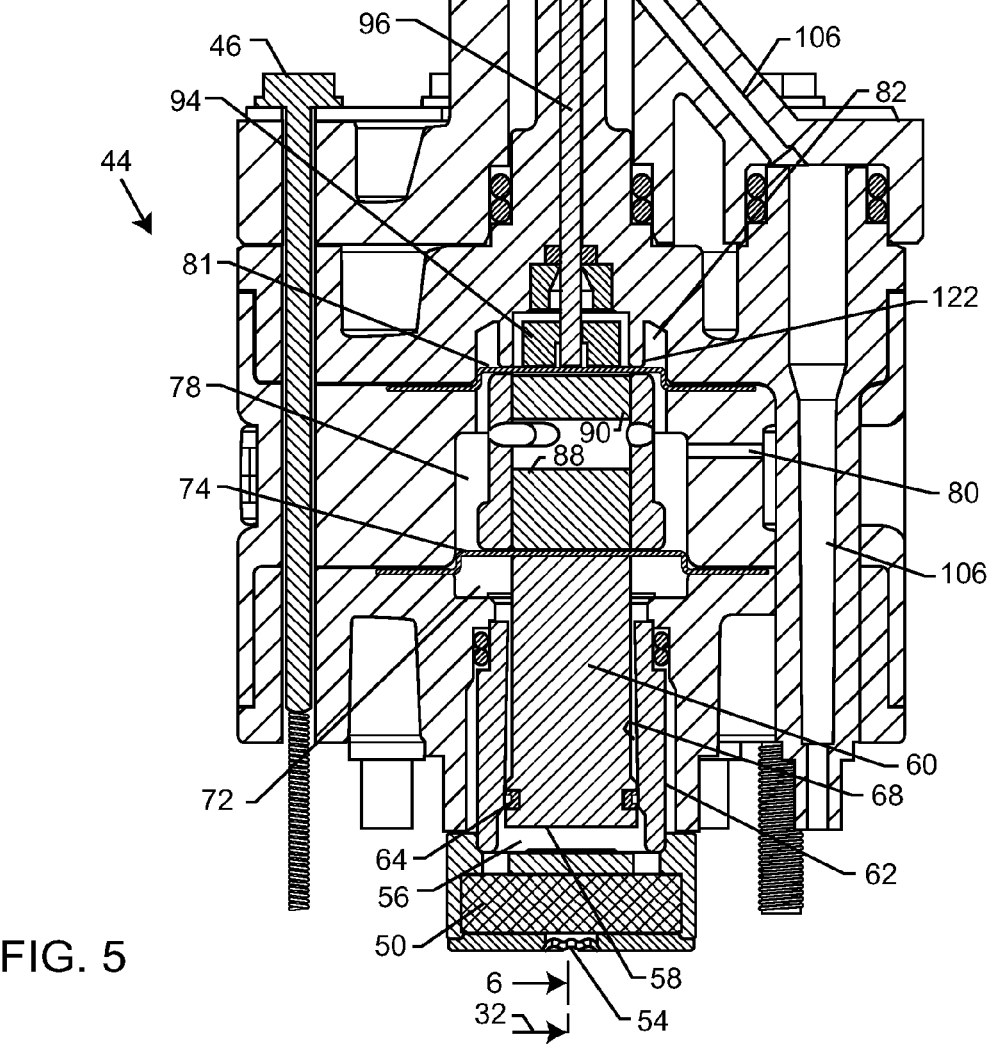
FIG. 5 is an enlarged vertical sectional view similar to FIG. 2, but showing the internal valve assembly with the pure water valve head and the brine valve stem in closed positions to halt flow of water through the RO system, and further depicting the brine poppet head in an open or flush position for initial flushing upon resumed pure water production.
Figure 6:
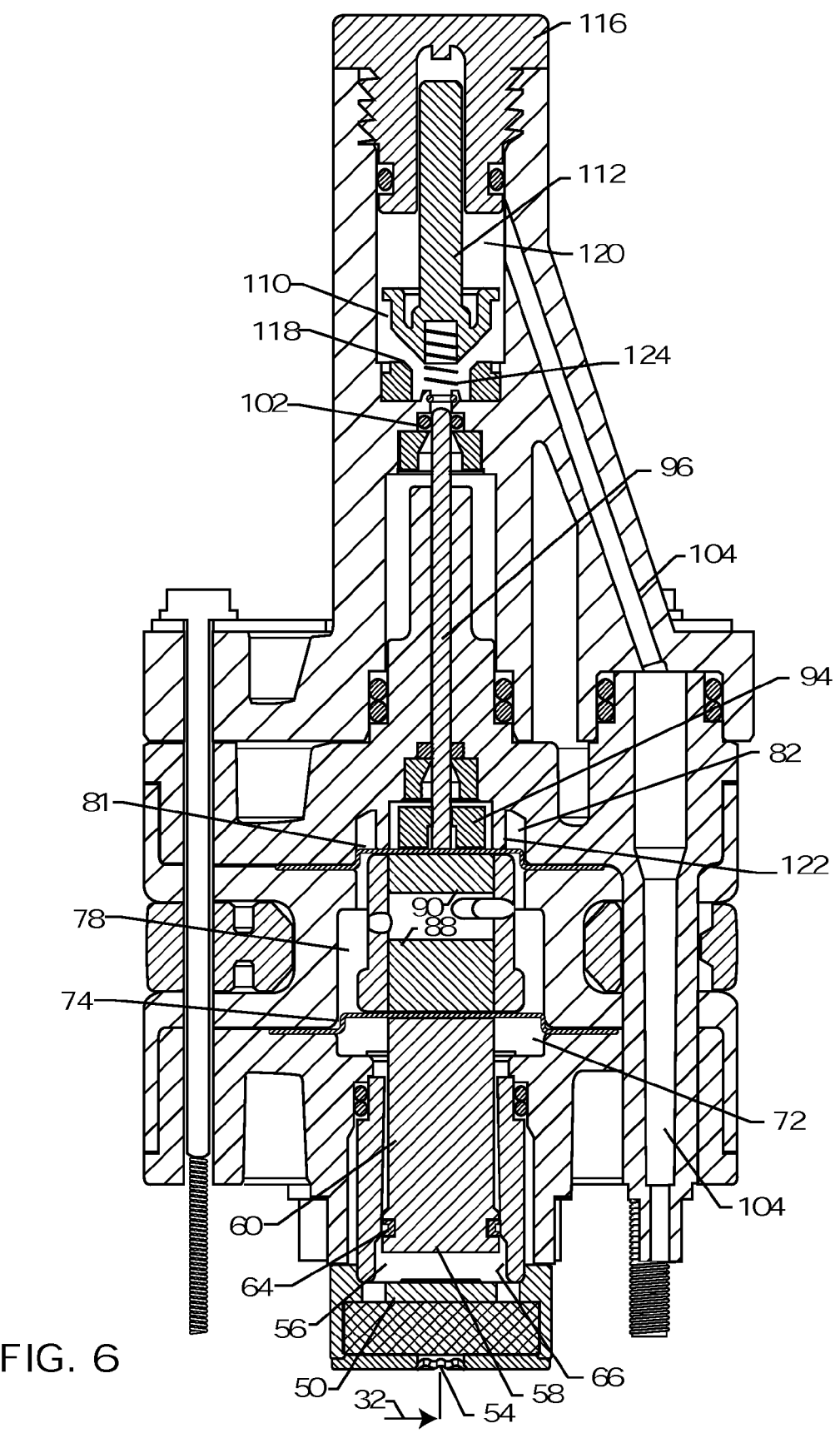
FIG. 6 is a vertical sectional view taken generally on the line 6-6 of FIG. 5.
Figure 7:
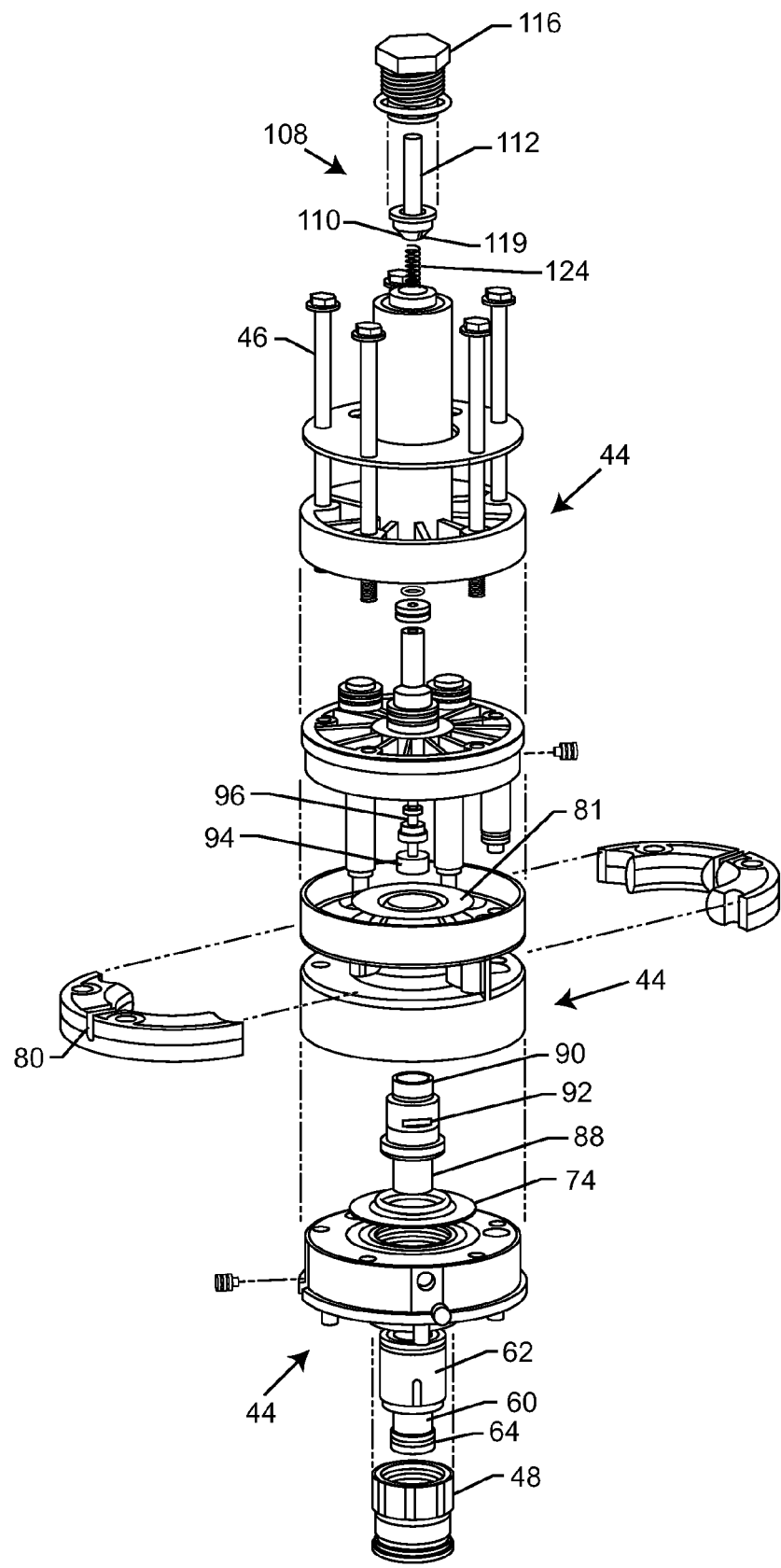
FIG. 7 is an exploded perspective view depicting components of the improved control valve.

When the brine shut-off valve stem pin 96 reaches the closed position in sealed engagement with the associated valve seat 100, brine flow to the drain 26 stops. When this occurs, the pressure differential across the poppet head 110 is also eliminated, whereupon a light force spring 124 reacting between the valve housing 44 and the face of the poppet head 110 pushes the poppet head 110 to a fully opened or retracted position relative to its associated poppet seat 118 (FIGS. 5-6).

Thereafter, upon dispensing of sufficient purified water 18 from the storage reservoir 24, the pressure at the underside of the lower diaphragm 74 is reduced sufficiently for the control valve structure including the pure water shut-off valve head 60 to displace downwardly for re-opening said valve head 60 (i.e., movement of the valve head 60 back to the open position as viewed in FIGS. 2-3) to resume pure water production. Concurrently, the brine shut-off valve stem pin 96 is retracted downwardly from the associated valve seat 100 to permit resumed brine flow to the drain 26. Importantly, when the brine shut-off valve stem pin 96 is initially opened with the brine poppet head 110 retracted from its associated poppet seat 118 (as shown in FIGS. 5-6), brine water flow rushes through the seat 118 and against the head 110 and associated groove 119 for flushing contaminants and/or particulate therefrom. Such flush brine flow quickly re-establishes a pressure differential across the poppet head 110, so that the poppet head 110 will move quickly against the light force spring 124 back to a position re-seated on the poppet seat 118 with the groove 119 defining a fixed area orifice (as viewed in FIGS. 5-6).

The control valve 22 remains in this open position for normal pure water production until the storage reservoir 24 again reaches a substantially filled condition, whereupon the control valve sequentially closes the pure water shut-off valve stem 60 and the brine shut-off valve stem pin 96, all as described previously herein.

Figure 8:
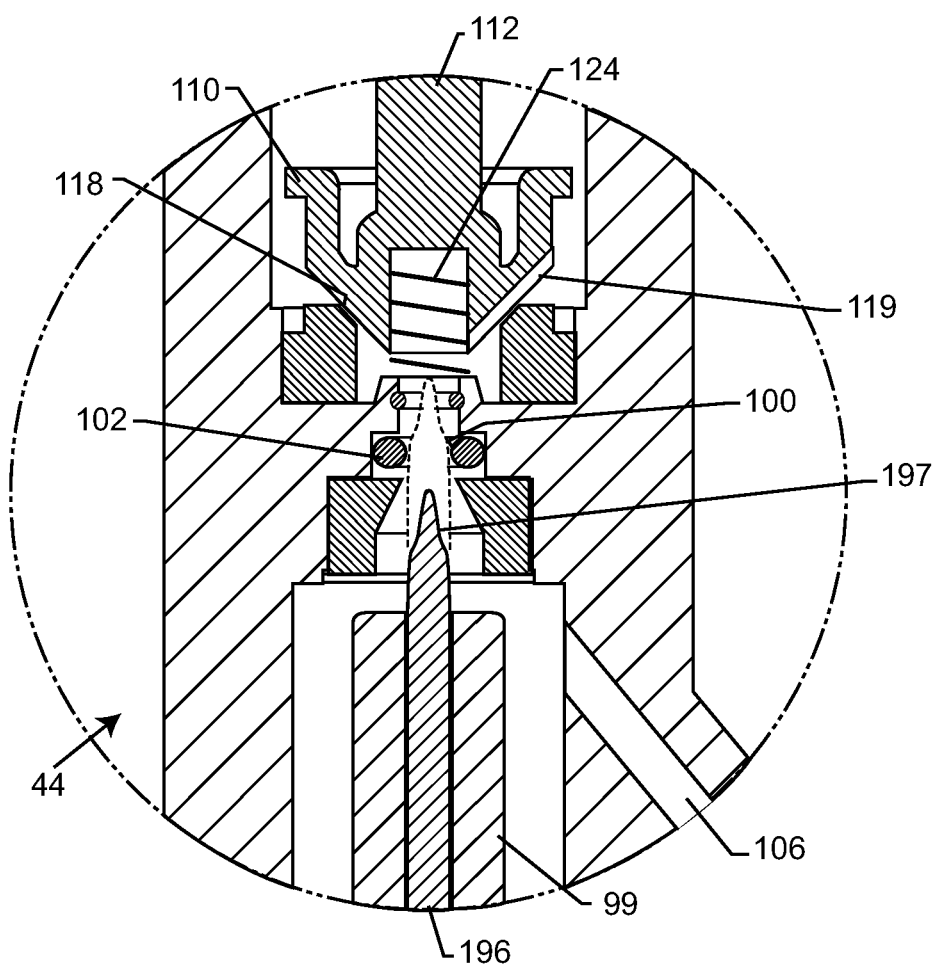
FIG. 8 is an enlarged and fragmented vertical sectional view corresponding generally with a portion of FIG. 3, but depicting an alternative preferred form of the invention.

FIG. 8 illustrates an alternative preferred form of the invention, wherein components identical to those previously shown and described with respect to FIGS. 1-7 are referred to by common reference numerals. In this alternative embodiment, a modified stem pin 196 has a specially contoured tip 197 for progressively halting the brine flow as the pure water reservoir 24 fills with produced purified water.

More particularly, the modified brine shut-off valve stem pin 196 is carried and supported as previously shown and described for movement upwardly as the pure water reservoir 24 is filled with produced purified water to eventually seat against a valve seat 100 defined by a O-ring seal member 102 or the like. However, as viewed in FIG. 8, the tip 197 of the modified stem pin 196 is contoured to define an elongated and upwardly narrowing tapered shape. Accordingly, initial upward displacement of the stem pin 196 progressively decreases the available open flow area through the still-open valve seat 100, for progressively and proportionally decreasing brine flow through said valve seat 100 to the drain 26 (FIGS. 1 and 2). Eventually, upon sufficient upward displacement of the stem pin 196, the larger cylindrical outer diameter of the stem pin 196 engages and seats with the O-ring 102 to close the brine flow path (shown in dotted lines in FIG. 8).

Upon subsequent dispensing of sufficient pure water from the reservoir 24, the stem pin 196 is shifted downwardly to re-open the brine flow path, as previously shown and described.

A variety of modifications and improvements in and to the reverse osmosis water purification system 10 and related improved control valve 22 of the present invention will be apparent to persons skilled in the art. By way of one limited example, it will be appreciated that the groove 119 formed in the poppet valve head 110 may if desired be formed in the associated valve seat 118. Accordingly, no limitation on the invention is intended by way of the foregoing description and accompanying drawings.

What is claimed is:

1. A control valve for a reverse osmosis water purification system, comprising:
    a multi-part valve housing having first and second ends;
    a pure water chamber disposed at the first end of the valve housing, wherein the pure water chamber has a pure water inflow port, a pure water outflow port and a pure water valve head slidably disposed therein;
    a brine water chamber disposed at the second end of the valve housing, wherein the brine water chamber has a brine water inflow port, a brine water outflow port and a brine water valve head slidably disposed therein, and is coupled to a feed water source;
    a central cavity disposed between the pure water chamber and the brine water chamber, the central cavity being exposed to atmospheric pressure and hermetically sealed from the pure water chamber by a first resilient diaphragm and from the brine water chamber by a second resilient diaphragm; and
    a frame disposed in the central cavity and operatively connected to the pure water valve head through the first resilient diaphragm and the brine water valve head through the second resilient diaphragm, wherein the frame, pure water valve head and brine water valve head are slidable as a single structure within the valve housing between an open position and a closed position.

2. The control valve of claim 1, wherein the pure water valve head and the brine water valve head comprise a magnetically attractable material and the frame carries a pair of magnets which operatively connect the frame to the pure water valve head and the brine water valve head.

3. The control valve of claim 2, wherein the pure water valve head and the brine water valve head comprise stainless steel.

4. The control valve of claim 1, wherein the pure water valve head and the brine water valve head are slidable in response to a pressure differential between a back pressure from the pure water outflow port exerted on the first resilient diaphragm and a head pressure from the feed water source exerted on the second resilient diaphragm.

5. The control valve of claim 4, wherein the first and second resilient diaphragms have relative surface areas configured to slide the pure water valve head and the brine water valve head from the open position to the closed position when the ratio of the back pressure from the pure water outflow port to the head pressure from the feed water source is greater than or equal to 2:3.

6. The control valve of claim 1, further comprising an elongated brine valve stem operatively connected to the brine water valve head at a first end and proximate to a brine shut-off valve seat at an opposite second end.

7. The control valve of claim 6, wherein the pure water valve head engages a pure water shut-off valve seat when in the closed position and the elongated brine valve stem engages the brine shut-off valve seat when in the closed position.

8. The control valve of claim 7, wherein the elongated brine valve stem and the brine shut-off valve seat are configured to engage in the closed position a predetermined time period after the pure water valve head engages the pure water shut-off valve seat in the closed position.

9. The control valve of claim 1, further comprising a brine poppet valve between the brine water inflow port and the brine water chamber, the brine poppet valve having a poppet head with a shallow groove therein, the poppet head being biased against a poppet seat by fluid pressure from a brine water inflow.

10. The control valve of claim 9, wherein the shallow groove defines a fixed flow orifice through the brine poppet valve when the poppet head is biased against the poppet seat.

11. The control valve of claim 9, wherein the brine poppet valve is spring biased away from the poppet seat when the brine water valve head is in the closed position.

12. A control valve for a reverse osmosis water purification system, comprising:
a multi-part valve housing having first and second ends;
a pure water chamber disposed at the first end of the valve housing, wherein the pure water chamber has a pure water inflow port, a pure water outflow port and a pure water valve head slidably disposed therein;
a brine water chamber disposed at the second end of the valve housing, wherein the brine water chamber has a brine water inflow port, a brine water outflow port and a brine water valve head slidably disposed therein, and is coupled to a feed water source;
a brine poppet valve disposed between the brine water inflow port and the brine water chamber, the brine poppet valve having a poppet head with a shallow groove therein, the poppet head being biased against a poppet seat by fluid pressure from a brine water inflow;
a central cavity disposed between the pure water chamber and the brine water chamber, the central cavity being exposed to atmospheric pressure and hermetically sealed from the pure water chamber by a first resilient diaphragm and from the brine water chamber by a second resilient diaphragm; and
a frame disposed in the central cavity and operatively connected to the pure water valve head through the first resilient diaphragm and the brine water valve head through the second resilient diaphragm, wherein the frame, pure water valve head and brine water valve head are slidable as a single structure within the valve housing between an open position and a closed position in response to a pressure differential between a back pressure from the pure water outflow port exerted on the first resilient diaphragm and a head pressure from the feed water source exerted on the second resilient diaphragm.

13. The control valve of claim 12, wherein the first and second resilient diaphragms have relative surface areas configured to slide the pure water valve head and the brine water valve head from the open position to the closed position when the ratio of the back pressure from the pure water outflow port to the head pressure from the feed water source is greater than or equal to 2:3.

14. The control valve of claim 12, wherein the shallow groove defines a fixed flow orifice through the brine poppet valve when the poppet head is biased against the poppet seat.

15. The control valve of claim 12, wherein the brine poppet valve is spring biased away from the poppet seat when the brine water valve head is in the closed position.

16. The control valve of claim 12, wherein the pure water valve head and the brine water valve head comprise a magnetically attractable material and the frame carries a pair of magnets which operatively connect the frame to the pure water valve head and the brine water valve head.

17. The control valve of claim 16, wherein the pure water valve head and the brine water valve head comprise stainless steel.

18. The control valve of claim 12, further comprising an elongated brine valve stem operatively connected to the brine water valve head at a first end and proximate to a brine shut-off valve seat at an opposite second end.

19. The control valve of claim 18, wherein the pure water valve head engages a pure water shut-off valve seat when in the closed position and the elongated brine valve stem engages the brine shut-off valve seat when in the closed position.

20. The control valve of claim 19, wherein the elongated brine valve stem and the brine shut-off valve seat are configured to engage in the closed position a predetermined time period after the pure water valve head engages the pure water shut-off valve seat in the closed position.

21. A control valve for a reverse osmosis water purification system, comprising:
a multi-part valve housing having first and second ends;
a pure water chamber disposed at the first end of the valve housing, wherein the pure water chamber has a pure water inflow port, a pure water outflow port and a pure water valve head slidably disposed therein, wherein the pure water valve head comprises a magnetically attractable material;
a brine water chamber disposed at the second end of the valve housing, wherein the brine water chamber has a brine water inflow port, a brine water outflow port and a brine water valve head slidably disposed therein, and is coupled to a feed water source, wherein the brine water valve head comprises a magnetically attractable material;
a brine poppet valve disposed between the brine water inflow port and the brine water chamber, the brine poppet valve having a poppet head with a shallow groove therein, the poppet head being biased against a poppet seat by fluid pressure from a brine water inflow, wherein the shallow groove defines a fixed flow orifice through the brine poppet valve when the poppet head is biased against the poppet seat;

a central cavity disposed between the pure water chamber and the brine water chamber, the central cavity being exposed to atmospheric pressure and hermetically sealed from the pure water chamber by a first resilient diaphragm and from the brine water chamber by a second resilient diaphragm; and a frame disposed in the central cavity and carrying a pair of magnets, wherein one of the pair of magnets is operatively connected to the pure water valve head through the first resilient diaphragm and the other of the pair of magnets is operatively connected to the brine water valve head through the second resilient diaphragm, wherein the frame, pure water valve head and brine water valve head are slidable as a single structure within the valve housing between an open position and a closed position in response to a pressure differential between a back pressure from the pure water outflow port exerted on the first resilient diaphragm and a head pressure from the feed water source exerted on the second resilient diaphragm.

22. The control valve of claim 21, wherein the pure water valve head and the brine water valve head comprise stainless steel.

23. The control valve of claim 21, wherein the first and second resilient diaphragms have relative surface areas configured to slide the pure water valve head and the brine water valve head from the open position to the closed position when the ratio of the back pressure from the pure water outflow port to the head pressure from the feed water source is greater than or equal to 2:3.

24. The control valve of claim 21, wherein the brine poppet valve is spring biased away from the poppet seat when the brine water valve head is in the closed position.

25. The control valve of claim 21, further comprising an elongated brine valve stem operatively connected to the brine water valve head at a first end and proximate to a brine shut-off valve seat at an opposite second end.

26. The control valve of claim 25, wherein the pure water valve head engages a pure water shut-off valve seat when in the closed position and the elongated brine valve stem engages the brine shut-off valve seat when in the closed position.

27. The control valve of claim 26, wherein the elongated brine valve stem and the brine shut-off valve seat are configured to engage in the closed position a predetermined time period after the pure water valve head engages the pure water shut-off valve seat in the closed position.

28. A control valve for a reverse osmosis water purification system having a reverse osmosis membrane, comprising:

housing means including a pure water chamber and a brine water chamber defined therein;

a pure water valve head movable within said pure water chamber between a normal open position permitting pure water production, and a closed position preventing pure water production;

a brine valve head movable within said brine water chamber between an open position permitting brine water outflow to a drain, and a closed position preventing brine water outflow to a drain; and means for displacing said pure water valve head and said brine water valve head as a unit between said open and closed positions;

said displacing means moving said brine valve head to said closed position a predetermined time period after said pure water valve head is moved to said closed position, to permit water flush flow across an upstream side of the reverse osmosis membrane for the duration of said predetermined time period to flush contaminants therefrom to the drain.

29. The control valve of claim 28 wherein said predetermined time period is from about 1 minute to about 3 minutes.

30. The control valve of claim 28 further comprising a brine poppet valve having a poppet head with a groove formed therein, said poppet head being urged against a poppet seat by brine water inflow into said brine water chamber and spring-biased away from said poppet seat, said brine valve head in said closed position halting brine water inflow into said brine water chamber to permit spring biased displacement of said poppet head away from said poppet seat, said brine valve head being movable to said open position upon resumed pure water production whereupon brine water inflow into said brine water chamber causes movement of said poppet head back toward engagement with said poppet seat with said groove defining a fixed flow orifice for brine water inflow into said brine water chamber.

* * * * *